United States Patent [19]

Talanker et al.

[11] Patent Number: 4,899,100
[45] Date of Patent: Feb. 6, 1990

[54] MICROWAVE MEASUREMENT OF THE MASS OF FROZEN HYDROGEN PELLETS

[75] Inventors: Vera Talanker, Golden, Colo.; Martin Greenwald, Belmont, Mass.

[73] Assignee: The United States of America as represented by the United States Department of Energy, Washington, D.C.

[21] Appl. No.: 226,571

[22] Filed: Aug. 1, 1988

[51] Int. Cl.⁴ ............................................. G01R 27/04
[52] U.S. Cl. .................................... 324/636; 324/71.4; 324/633
[58] Field of Search ................ 324/71.3, 71.4, 58.5 C, 324/58 C

[56] References Cited

U.S. PATENT DOCUMENTS

| | | | |
|---|---|---|---|
| 3,437,922 | 4/1969 | Miller | 324/58.5 C |
| 4,042,879 | 8/1977 | Ho | 324/58.5 C |
| 4,050,015 | 9/1977 | Zollner | 324/58.5 C |
| 4,277,741 | 7/1981 | Faxvog | 324/58.5 C |
| 4,369,404 | 1/1983 | Flygare | 324/58.5 C |

OTHER PUBLICATIONS

Wenger; "Hydrogen Density Measurements Using an Open Ended Microwave Cavity"-IEEE Trans. on Instrumentation-May 72.

Primary Examiner—Reinhard J. Eisenzopf
Assistant Examiner—Jose M. Jolis
Attorney, Agent, or Firm—Paul A. Gottlieb; Frank J. Kozak; William R. Moser

[57] ABSTRACT

A nondestructive apparatus and method for measuring the mass of a moving object, based on the perturbation of the dielectric character of a resonant microwave cavity caused by the object passing through the cavity. An oscillator circuit is formed with a resonant cavity in a positive feedback loop of a microwave power amplifier. The moving object perturbs the resonant characteristics of the cavity causing a shift in the operating frequency of the oscillator proportional to the ratio of the pellet volume to the volume of the cavity. Signals from the cavity oscillation are mixed with a local oscillator. Then the IF frequency from the mixer is measured thereby providing a direct measurement of pellet mass based upon known physical properties and relationships. This apparatus and method is particularly adapted for the measurement of frozen hydrogen pellets.

9 Claims, 2 Drawing Sheets

MICROWAVE MEASUREMENT OF THE MASS OF FROZEN HYDROGEN PELLETS

CONTRACTUAL ORIGIN OF THE INVENTION

The U.S. Government has rights to this invention pursuant to Contract No. DE-AC02-78ET51013 between the U.S. Department of Energy and the Massachusetts Institute of Technology.

BACKGROUND OF THE INVENTION

The present invention enables measurement of the mass of a moving object if its composition is known. The invention has application to present experiments in controlled fusion and to future fusion reactors.

The tokamak design fusion reactor maintains a doughnut-shaped high-temperature plasma of hydrogen isotope ions by means of rings of magnets. Replenishing the plasma with hydrogen (which is the fuel of the reactor) is necessary to maintain a sustaining fusion reaction. Also, it is considered preferable to provide hydrogen fuel to the interior of the plasma. Different methods have been considered for this operation of fueling the plasma in the tokamak ring. One highly considered technique consists of injecting frozen pellets of hydrogen isotopes into the plasma. As discussed by S. L. Milora, in "Review of Pellet Fueling", J. Fusion Energy, Vol. 1, page 15 (1981), frozen hydrogen isotope pellets can be made and injected into the plasma at a speed of approximately $10^3$ meters per second. This injection technique enables the hydrogen fuel pellets to penetrate deep into the plasma before evaporating, thereby providing the hydrogen fuel to the interior of the plasma.

Further research into the hydrogen pellet injection technique as well as optimizing the operating parameters of an actual fusion reactor will require accurate measurement of the amounts of hydrogen supplied in such pellets. Accurate measurement of the mass of the hydrogen pellets is necessary as a diagnostic for the pellet injector equipment. When functioning properly, the pellet injector should produce pellets within a known range of size. With a reliable, accurate, nondestructive method for measuring pellet mass, it is possible to monitor the performance of the injector.

Accurate measurement of the mass of the hydrogen pellet is also important for studies of pellet ablation and penetration. Pellet ablation rates and penetration into the plasma are a strong function of pellet mass. Comparison between experiments and theoretical models of pellet ablation can only be made if reasonable values for pellet mass are available. Hydrogen pellet mass measurement is also necessary for studies of plasma profile relaxation and plasma transport subsequent to pellet injection. Earlier work has shown that the response of the tokamak plasma to pellet injection can depend strongly on pellet mass. There seems to be a threshold in mass, above which the beneficial effects of central fueling are seen. Further studies will require an accurate determination of pellet size.

Present techniques for manufacturing such pellets do not provide pellets of uniform size. Weighing such pellets is difficult because hydrogen pellets are created and maintained at extremely low temperatures on the order of 10° Kelvin. Also, some of the pellet mass is lost during injection. It is therefore necessary to develop an accurate and nondestructive method for determining the size of the pellets on a shot to shot basis.

Two methods to determine the mass of a moving hydrogen pellet were suggested in an article by P. B. Jensen and V. Anderson, entitled "Handling of Deuterium Pellets for Plasma Refueling" J. Phys. D. Appl. Phys. Vol. 15, page 785 (1982). The first of these methods involves capacitive sensing. The pellet is injected between two capacitor plates. The passing pellet slightly alters the capacitance and this slight alteration can be measured and related to the mass of the pellet. In the second method described by Jensen and Anderson, a microwave cavity is provided through which the pellet can pass. The cavity is mistuned from its resonant frequency so that power is reflected back to the driving amplifier from the cavity. The amplitude of the reflection is measured. Passage of a pellet through the cavity changes the resonant frequency of the circuit which causes a change in the amplitude of power reflected back to the amplifier. This change in amplitude can be measured and related to the mass of the pellet. It can be appreciated that this latter method is an analog method and would rely upon regular and careful calibration of the components for accurate measurements.

Therefore, it is an object of this invention to measure the mass of a moving hydrogen pellet with a method that does not rely on calibration, but instead utilizes a direct theoretical relationship.

It is a further object of the present invention to measure the mass of a moving pellet in an accurate and nondestructive means.

It is a still further object of this invention to provide a means for measuring the amount of hydrogen fuel supplied via pellet injection to the plasma of a fusion reactor having a tokamak ring design.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

This invention is a nondestructive apparatus and method for measuring the mass a moving object, and in particular of high speed frozen hydrogen pellets. The measurement of pellet mass is based on the perturbation of the dielectric character of a resonant microwave cavity caused by the pellet passing through the cavity. An oscillator circuit is formed with a resonant cavity in a positive feedback loop of a microwave power amplifier. The injected pellet perturbs the resonant characteristics of the cavity causing a shift in the operating frequency of the oscillator proportional to the ratio of the pellet volume to the volume of the cavity. Signals from the cavity oscillation are mixed with a local oscillator. Then the IF frequency from the mixer is measured thereby providing a direct measurement of pellet mass based upon known physical properties and relationships. This produces a result which is insensitive to amplitude or frequency calibration of the components.

DETAILED DESCRIPTION OF THE DRAWINGS

Figure 1:
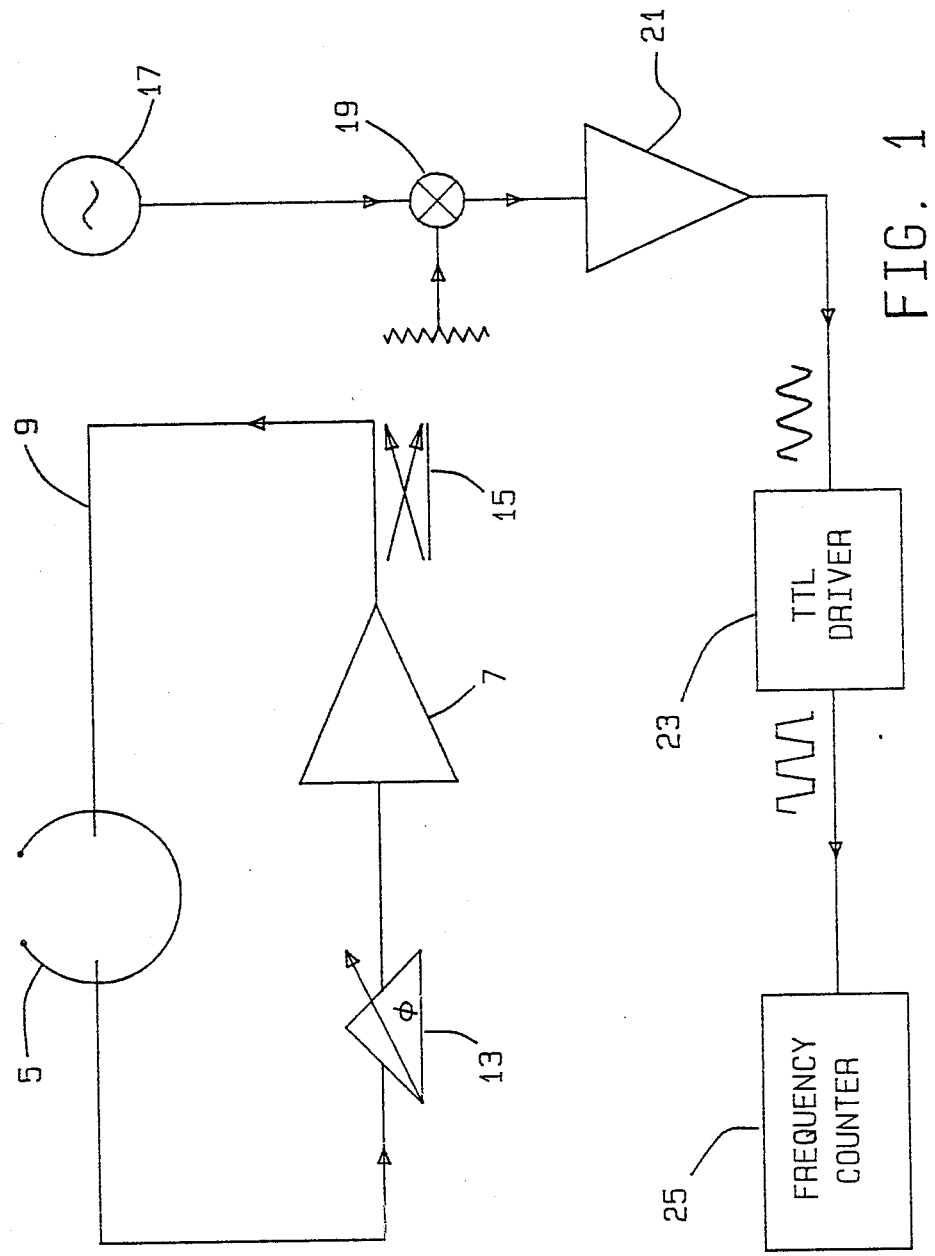
FIG. 1 is a diagram showing the invention in relationship to the pellet injector.

Referring to FIG. 1, there is shown a schematic diagram of the present invention. A microwave amplifier 7 with a resonant cavity 5 in its positive feedback loop circuit 9 forms an oscillator. The operating frequency of this oscillator is determined by the dynamic range of amplifier 7, the resonant characteristics of the cavity 5, and the phase shift introduced by the connecting cables (shown schematically as phase shift 13).

$$\left[ \frac{\omega}{\omega_o} - \frac{\omega_o}{\omega} \right] = \frac{1}{Q} \tan\left( \frac{2\pi l}{c} \right) \quad (1)$$

where $\omega$ is the operating frequency of the oscillator, $\omega_o$ is the resonant frequency of the cavity, Q is the quality factor of the cavity, l is the length of the connecting cables, and c is the speed of light.

Figure 2:
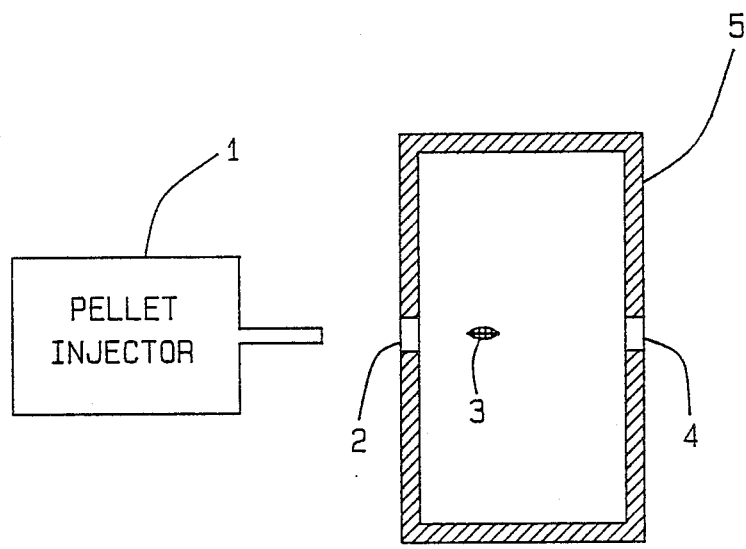
FIG. 2 is a block diagram of the invention.

Referring to FIG. 2, pellet injector 1 shoots a pellet 3 of known composition through microwave cavity 5 having apertures 2 and 4 to accomodate passage of pellet 3. In the proposed application, microwave cavity 5 will be positioned between pellet injector 1 and the interior of the fusion reactor tokamak ring where the plasma 6 will be contained. The microwave cavity 5 will be placed within a few centimeters of the barrel of the injector 1 and can be considered to be part of the pellet injection apparatus. Pellet 3 can therefore be measured while it is in flight just prior to entering the plasma. The present invention should be operational whenever the pellet injector is in use. The only triggering requirements are for a data acquisition system which would be synchronized to the pellet firing.

Introduction of a small dielectric (e.g. hydrogen pellet) causes perturbations to the cavity's resonant frequency and, consequently, changes the frequency of the oscillations. The dielectric perturbation is described by the equation $$\frac{\omega' - \omega_0}{\omega'} = \frac{-\int\int\int_{\Delta V} dV(\epsilon - \epsilon_0)|E_o|^2}{2\int\int\int_V dV\epsilon_0|E_o|^2} \quad (2)$$

where $\omega^1$ is the perturbed resonant frequency of the cavity, $\epsilon^1_o$ is the unperturbed electric field inside the cavity, $\epsilon$ is the permittivity of the perturbing dielectric, and $\Delta V$ is the volume of the dielectric. It is evident from Equation (1) that for $(\omega/Q)(l/c)<</$, shift in the frequency of the oscillations is proportional to the ratio of the pellet volume to the volume of the cavity.

$$\frac{\Delta f}{f} \alpha \frac{\epsilon - \epsilon_o}{\epsilon_o} \frac{\Delta V}{V} \quad (3)$$

The detection of an IF-range frequency shift resulting from the dielectric perturbation is accomplished by heterodyning. Part of the signal power from amplifier 7 is diverted to the input of a mixer 19 via a directional coupler 15. Mixer 19 also receives input from local oscillator 17. Output from mixer 19 is amplified by second amplifier 21 and then rectified into a square wave by TTL driver 23. Output of the TTL driver goes to frequency counter 25.

The lowest frequency component of the mixer 19 output is a signal whose frequency is equal to the difference between the operating frequencies of the local oscillator 17 and that of the feedback circuit 9. The change in frequency of the IF output is equal to the change in the resonant frequency of cavity 5. A digital frequency counter 25 triggered by the pellet injector 1 is used to monitor the frequency of the mixer 19 output.

Several factors determine the optimum frequency for the mass detector. The size of the cavity (and thus its resonant frequency) must be compatible with the layout of the pellet injector and pellet line to the plasma. There is an economic requirement of using a frequency range in common commercial use (X band at 8-12 Ghz in the present case). There is also a need to maximize sensitivity by running at the top of the available frequency band. Given the above constraints, the present invention should be capable of determining the pellet mass with about 1% accuracy.

In a "proof-of-principle" experiment, dielectric polyethylene pellets were used, rather than pellets made out of frozen hydrogen, since the latter were more difficult to work with. Pellets with the average volume of approximately 0.26 mm$^3$ were manufactured inside a pellet injector. Pellet velocity was dependent on the pressure level of the driving gas. At 400 psi the velocities of several pellets were measured using a signal from two photodiodes and the average velocity was determined to be approximately 500 meter/second.

The polyethylene pellets were injected into a cylindrical copper cavity inside which the TM$_{010}$ mode of the EM fields was excited. The cavity dimensions were 26 millimeter diameter and 15 millimeter length. Small non-radiating apertures in the centers of the transverse walls of the cavity allowed for passage of a pellet. The pellet moved along the central axis of the cavity with velocity such that the pellet's radial deflection as a result of gravitational acceleration was negligible. Therefore, during its presence in the cavity, a pellet caused a constant maximized shiftin the frequency of the oscillator circuit.

Inductive loop coupling was used to couple the TM$_{010}$ mode into the cavity. The noise produced by the Narda 60164 power amplifier initiated the oscillations. The frequency limitations of the amplifier and the directional coupler (Narda 3044-20) guaranteed that the higher frequency modes were not excited in the cavity. With the aid of the spectrum analyzer it was determined that the maximum energy of the oscillator circuit was located at a frequency approximately 8.75 GHz. The output from the directional coupler was mixed with a signal from a local oscillator. T-junction for BNC cables was connected to the input of an HP 8473B detector in order to achieve a non-linear combination of the two signals. To select the frequency range of the shifted down signal, the output of the mixer was connected to a spectrum analyzer, and the frequency of the local oscillator was adjusted to yield the difference frequency of 3-4 MHz.

The peak-to-peak value of the IF signal leaving the mixer was measured to be 1 mV. The signal was amplified to the TTL level, rectified into a square wave, an additional transistor stage consisting of an emitter-follower was added to drive the 50 ohm input impedance of the frequency counter with the square wave signal. The operation of the frequency counter was based on counting the number of low-to-high transitions of the input signal during one cycle of a pre-set clock. Because this measurement scheme was an integer measurement, there was a ±1 ambiguity in the number of cycles. A LeCroy 8590 scaler was used as the frequency counter, with its latch input connected to the output of the LeCroy 8501 programmable clock. The clock was triggered by the pellet injector trigger and the LeCroy 8801 memory module was used to store the data.

The expected frequency shift was calculated as $$\Delta f = -f_0 \frac{(\epsilon - \epsilon_0) V_{pellet} E_0^2}{\displaystyle\int_0^R 2\pi d\rho \epsilon_0 \left| E_0 J_0 \left(\frac{2.405\rho}{R}\right)\right|^2} = -f_0 \frac{1}{J_1^2(2.405)} \frac{\epsilon - \epsilon_0}{\epsilon_0} \frac{V_{pellet}}{V}. \quad (4)$$

$$\Delta f = -8.75 \text{ GHz} \times \frac{1}{.25} \frac{1 \times .26}{8 \times 10^3} = -1.1 \text{ MHz}, \quad (5)$$

the dielectric constant of polyethylene at 9 GHz is equal to 2. A frequency shift of 1 MHz lasted for 30–50 microseconds.

Application of this invention for use with hydrogen pellets in a fusion reactor will require modifications to the design in the "proof-of-principle" experiment. Higher operating frequencies may be necessary in order to accurately measure the size of smaller pellets or pellets travelling with greater velocities. In accordance with the "uncertainty principle" the frequency resolution is limited by the amount of time that the pellet spends in the cavity. For a fixed ratio of the pellet volume to the volume of the cavity, better resolution can be obtained at higher frequencies. Resolving power, in the case of the $TM_{010}$ mode is proportional to the cubic power of the resonant frequency.

An alternative scheme for measuring the frequency shift may also be utilized. Reciprocal frequency counting involves counting the number of transitions of a fast clock during one cycle of the input signal, rather than the number of the input signal transitions during one cycle of an arbitrary clock. Reciprocal frequency counting provides higher contrast, and the perturbation due to the pellet can be calculated more easily.

The present invention has clear and distinct advantages over the method which relies on measuring the backscatter from a perturbed cavity, such as proposed in the Jensen and Anderson article. The present invention has at least the same inherent accuracy as the backscatter method. However, insofar as the present invention relies on a direct theoretical relationship, it does not require regular and frequent calibration, such as the backscatter method would require. Accordingly, the present invention is distinctly advantageous as applied to measurement of hydrogen pellet mass in a fusion reactor system or experiment where long-term stable and accurate measurements are required in a potentially hazardous environment. In addition, because the present invention relies on direct theoretical relationships, it can be more easily adapted into an automated computer control system for the fusion reactor.

The embodiments of the invention in which an exclusive property or privilege is claimed are defined as follows:

1. An apparatus for measuring the mass of an individual hydrogen pellet in a series of pulsed injection of hydrogen pellets comprising:
   a microwave amplifier;
   a feedback loop circuit connecting the output and input of said microwave amplifier;
   a microwave transmission cavity in said feedback loop circuit aligned so that a series of pulsed injection of hydrogen pellets can pass through said microwave transmission cavity, said microwave transmission cavity capable of operating at resonant frequency with said amplifier and said feedback loop circuit;
   frequency shift detection means responsive to said feedback loop circuit, said frequency shift detection means capable of measuring a change in resonant frequency of said microwave transmission cavity if a hydrogen pellet passes through said cavity;
   whereby the mass of a hydrogen pellet of the series of hydrogen pellets can be determined by the measured frequency shift.

2. An apparatus for measuring the mass of a moving hydrogen pellet comprising:
   a microwave amplifier;
   a feedback loop circuit connecting the output and input of said microwave amplifier;
   a microwave transmission cavity in said feedback loop circuit aligned so that the moving hydrogen pellet can pass through said microwave transmission cavity, said microwave transmission cavity capable of operating at resonant frequency with said amplifier and said feedback loop circuit;
   frequency shift detection means capable of measuring a change in resonant frequency of said microwave transmission cavity if a moving hydrogen pellet passes through said cavity, said frequency shift detection means including:
      an oscillator;
      a mixer responsive to said oscillator and said feedback loop circuit;
      a frequency counter responsive to said mixer whereby the mass of the moving hydrogen pellet can be determined by the measured frequency shift.

3. The apparatus of claim 2 wherein said frequency shift detection means includes:
   a second amplifier responsive to said mixer; and
   a TTL driver responsive to said second amplifier, said TTL driver capable of sending rectified signals to said frequency counter.

4. The apparatus of claim 3 in which said feedback loop circuit includes a directional coupler.

5. The apparatus of claim 4 in which said mixer is responsive to said directional coupler.

6. The apparatus of claim 5 in which said feedback loop circuit includes phase shift linkage means.

7. The apparatus of claim 1 including:
   a pellet injector constructed and adapted to provide a pulsed injection of hydrogen pellets, said pellet injector located so that pellets ejected pass through said microwave transmission cavity.

8. An apparatus for providing measurement of a pulsed injection of frozen hydrogen pellets to a fusion reactor comprising:

an injector connected to a source of frozen hydrogen pellets and capable of propelling frozen hydrogen pellets from the source of frozen hydrogen pellets to the fusion reactor;

a microwave circuit including:

a microwave transmission cavity located between said injector and the fusion reactor through which the pulsed injection of frozen hydrogen pellets from said injector can pass;

a microwave amplifier connected to said microwave circuit capable of driving said microwave transmission cavity at resonant frequency with said microwave circuit; and a frequency shift detection means responsive to said microwave circuit capable of measuring a change in resonant frequency of said microwave transmission cavity in response to the pulsed injection of frozen hydrogen pellets to the fusion reactor.

9. A method for determining the mass of a moving object of known composition comprised of the steps of:

driving a microwave transmission cavity contained in a microwave circuit at resonant frequency, said microwave transmission cavity being aligned so that the object passes through said microwave transmission cavity; and comparing the resonant frequency of said microwave transmission cavity when the moving object is passing through said microwave transmission cavity with the resonant frequency of said microwave transmission cavity in the absence of the moving object;

whereby the mass of the moving object can be determined.

* * * * *